United States Patent
Hayes et al.

[15] 3,669,449
[45] June 13, 1972

[54] METHOD AND APPARATUS FOR FORMING REFRACTORY PANELS

[72] Inventors: Robert R. Hayes, Euclid; John L. Fuller, Shaker Heights; James R. Stockham, Lakewood, all of Ohio

[73] Assignee: Oglebay Norton Company, Cleveland, Ohio

[22] Filed: April 20, 1970

[21] Appl. No.: 30,114

[52] U.S. Cl. ............................................. 271/74, 271/26
[51] Int. Cl. ........................................................ B65h 29/32
[58] Field of Search ......................................... 271/74, 84, 26

[56] References Cited

UNITED STATES PATENTS

| | | | |
|---|---|---|---|
| R23,668 | 6/1953 | Von Hofe | 271/74 X |
| 2,538,972 | 1/1957 | Magnani | 271/74 X |
| 3,404,789 | 10/1968 | Georgeff et al. | 271/74 X |
| 3,218,069 | 11/1965 | Halberschmidt | 271/74 X |

Primary Examiner—Joseph Wegbreit
Attorney—Yount and Tarolli

[57] ABSTRACT

An improved apparatus for forming refractory panels includes a shredder assembly for shredding asbestos. Vacuum or suction is applied to an upper portion of a mix tank, which is partially filled with water, to pneumatically introduce the shredded asbestos and a silica flower into the mix tank at a level below the water line to facilitate the formation of a refractory slurry in the mix tank. This refractory slurry is then conducted to a holding tank and from there to an associated vacuum box molding assembly. The vacuum box molding assembly includes a universal contour plate assembly for forming a mold cavity which is flooded with the refractory slurry. Vacuum or suction is applied to the mold cavity to draw off water from the slurry and form a wet cake panel. After the universal contour plate assembly has been pivoted to a raised position, a vacuum lift head on a radial arm machine pneumatically engages the wet cake panel and transfers it to a conveyor which transports the wet cake panel to a drying oven.

3 Claims, 11 Drawing Figures

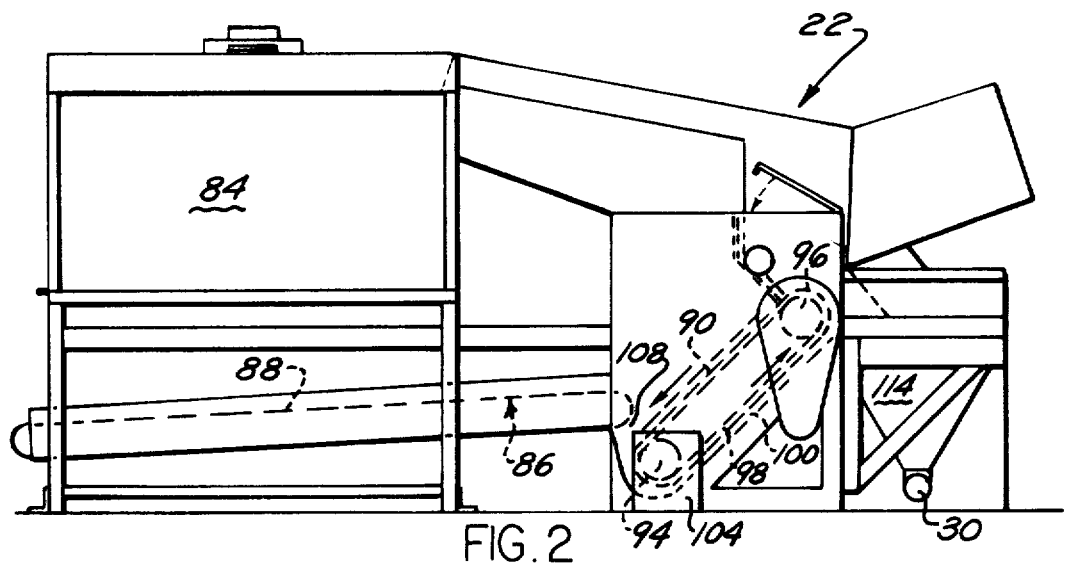
FIG. 2
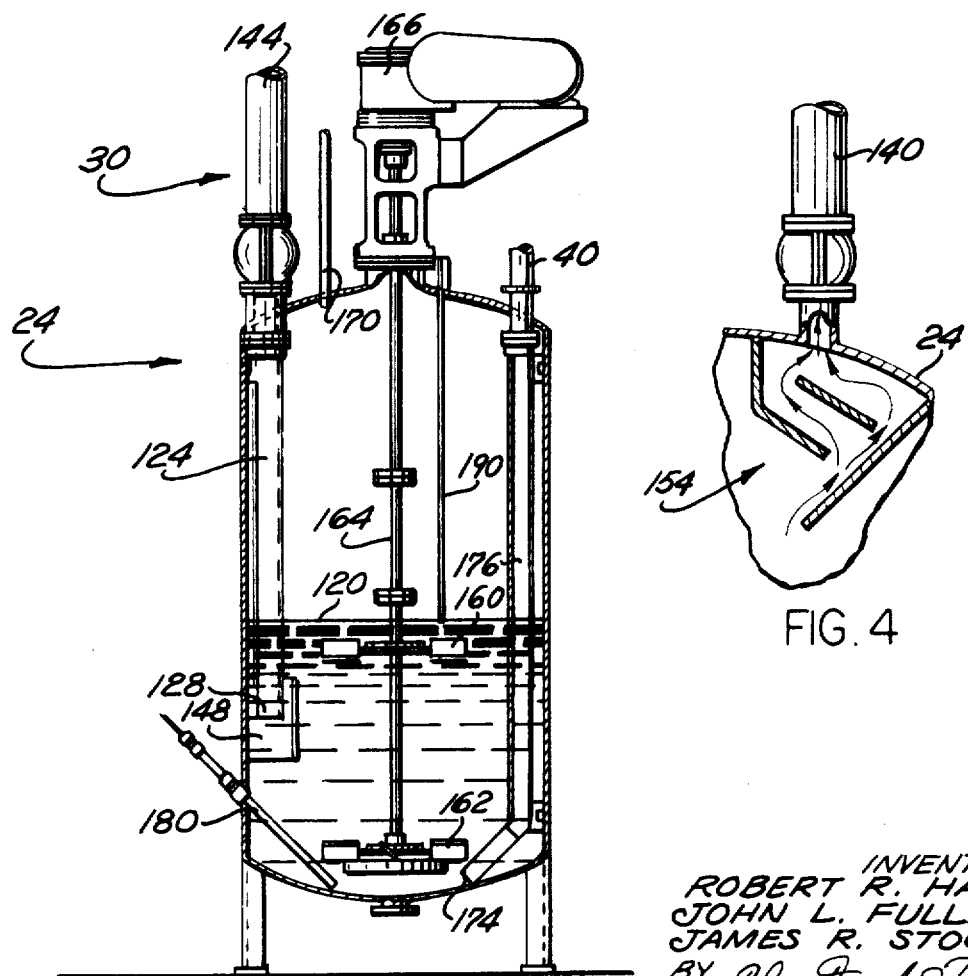
FIG. 3
FIG. 4
INVENTORS
ROBERT R. HAYES
JOHN L. FULLER
JAMES R. STOCKHAM
BY Yount and Tarolli
ATTORNEYS

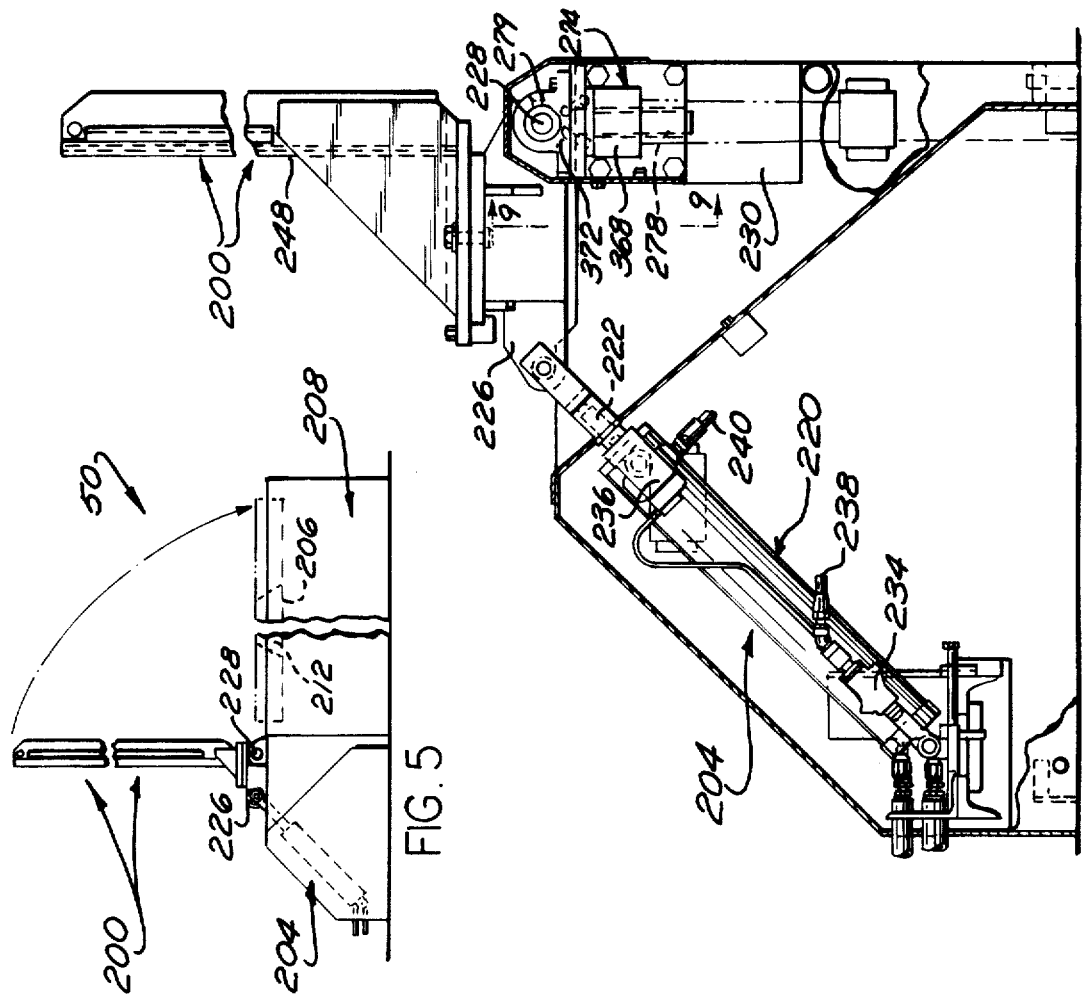
FIG. 5
FIG. 6
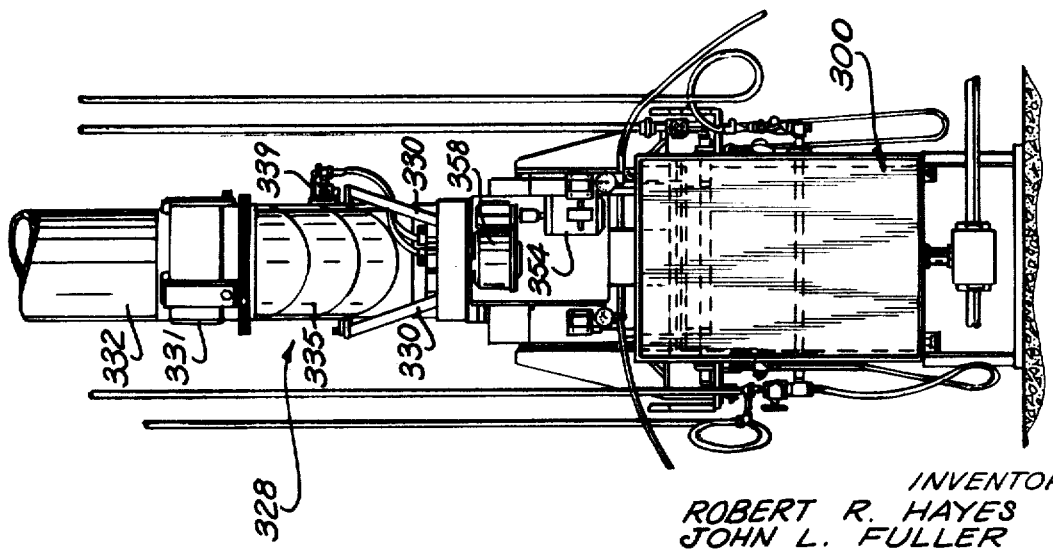
FIG. 11
INVENTORS
ROBERT R. HAYES
JOHN L. FULLER
JAMES R. STOCKHAM
BY Yount and Tarolli
ATTORNEYS INVENTORS
ROBERT R. HAYES
JOHN L. FULLER
JAMES R. STOCKHAM
BY Yount and Tarolli
ATTORNEYS

METHOD AND APPARATUS FOR FORMING REFRACTORY PANELS

The present invention relates to a method apparatus for use in forming articles made of refractory material.

It is an object of this invention to provide a new and improved method and apparatus for forming a refractory slurry containing shredded asbestos, for molding a wet cake article of refractory material by de-watering the refractory slurry, and for transporting the wet cake refractory article from a molding assembly to a conveyor which transports the wet cake refractory article to an oven where it is dried or cured.

A further object of this invention is to provide a new and improved method and apparatus for forming a refractory slurry containing asbestos including operating a shredder assembly to shred the asbestos, and pneumatically conducting the shredded asbestos to a mix tank which is partially filled with water by applying vacuum to an upper portion of the mix tank and introducing the shredded asbestos into the water in the mix tank to promote a mixing of the shredded asbestos and the water to form a refractory slurry.

Another object of this invention is to provide a new and improved vacuum box molding assembly which includes a universal contour plate assembly having a frame in which contour plates of various sizes for defining mold cavity of different sizes can be mounted to enable the vacuum box molding assembly to form wet cake refractory articles of different sizes without changing the entire contour plate assembly.

Another object of this invention is to provide a new and improved vacuum box molding assembly having a contour plate assembly which is pivotally mounted in association with a support shaft and wherein the support shaft is movable relative to a vacuum box to enable the contour plate assembly to form a tight seal with the vacuum box.

Another object of this invention is to provide a new and improved method and apparatus for transporting molded, wet cake articles with a lift head and then moving the lift head and wet cake article to a receiving station where it is deposited by the lift head.

Another object of this invention is to provide a new and improved apparatus for transporting a wet cake article wherein the apparatus includes a lift head for applying vacuum to a surface of the wet cake article, a drive assembly for moving the lift head from a station where the wet cake article is pneumatically engaged by the lift head to a receiving station, and control apparatus for interrupting the application of vacuum to the wet cake article by the lift head to effect a depositing of the wet cake article at the receiving station.

Another object of this invention is to provide a new and improved apparatus for molding wet cake articles and transporting the wet cake articles from a molding station to a receiving station wherein the apparatus includes a plurality of vacuum box molding assemblies for molding wet cake articles having a desired configuration from a refractory slurry and a transporting machine having a lift head which is selectively movable to a position overlying a wet cake article molded at any one of the plurality of vacuum box molding assemblies and is operable to apply vacuum or suction to the molded wet cake article to pneumatically engage the article, the transport machine being operable to move the lift head and a pneumatically engaged wet cake article from the molding machine to a receiving station where the wet cake article is deposited by interrupting the application of vacuum or suction to the wet cake article by the lift head.

These and other objects and features of the present invention will become more apparent upon a consideration of the following description taken in connection with the accompanying drawings wherein:

FIG. 1 is a schematic layout illustration depicting the relationship between a shredder assembly for shredding asbestos, a mix tank for mixing the asbestos with a liquid to form a refractory slurry, a plurality of vacuum box molding assemblies for molding the slurry to form wet cake articles, and a plurality of radial arm machines for transporting the wet cake articles from the vacuum box molding assemblies to a conveyor for conducting the articles to a drying oven;

FIG. 2 is a schematic illustration of the shredder assembly for shredding asbestos;

FIG. 3 is a schematic illustration of a mix tank assembly for mixing the shredded asbestos and other materials with water to form a refractory slurry;

FIG. 4 is a fragmentary sectional view schematically illustrating the relationship between a baffle assembly and a conduit for applying suction to the mix tank of FIG. 3 and for conducting water to the mix tank;

FIG. 5 is a schematic illustration of a vacuum box mold assembly constructed in accordance with the present invention and illustrating the relationship between a vacuum box and a universal contour plate assembly constructed in accordance with the present invention;

FIG. 6 is a schematic illustration of an operator assembly for moving the universal contour plate assembly between a lowered or molding position and a raised position in which the universal contour plate assembly is spaced from a wet cake article formed by the vacuum box molding assembly of FIG. 5;

Figure 10:
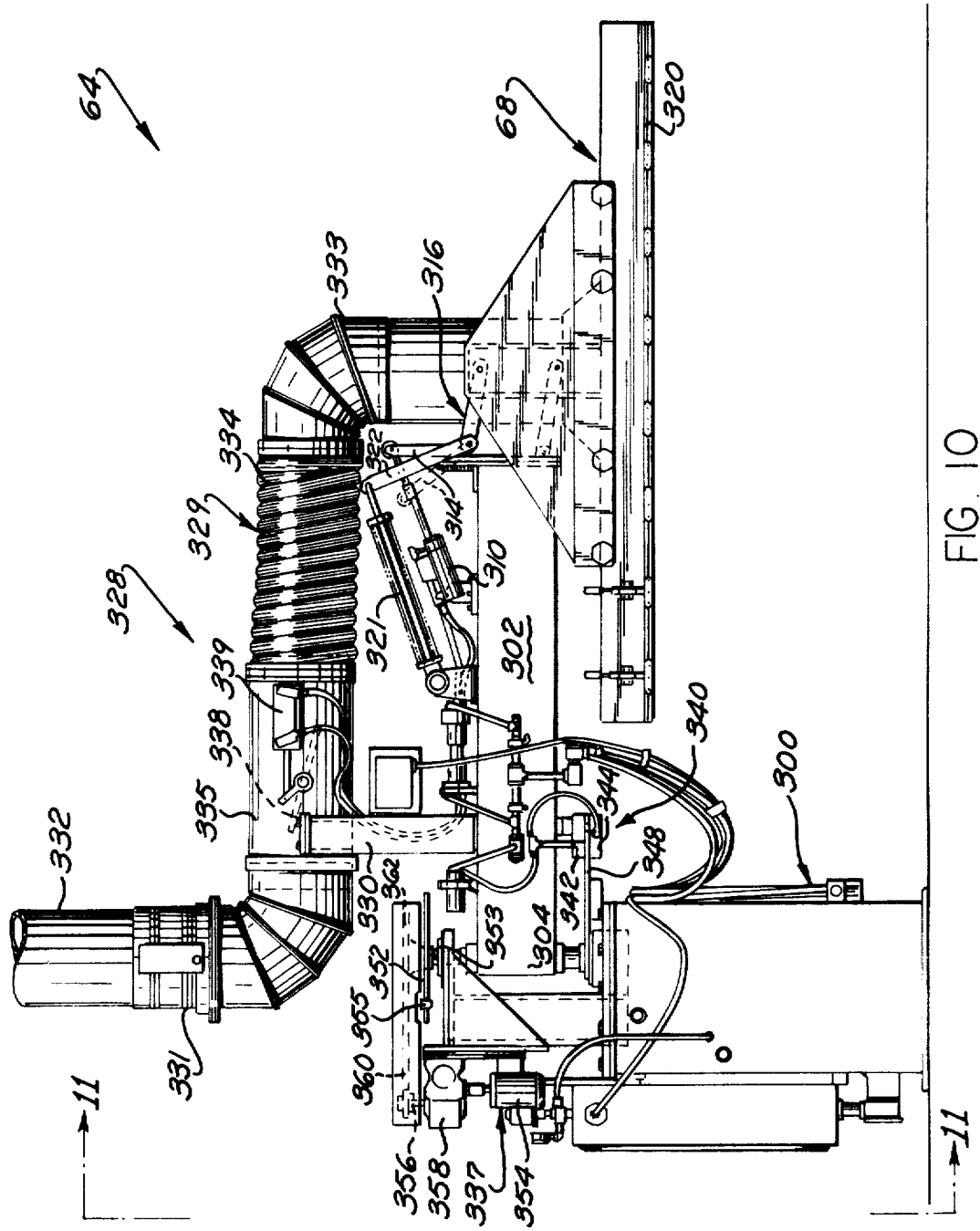
FIG. 10 is a schematic elevational view of a radial arm machine for transporting wet cake articles from the vacuum box molding assembly of FIG. 5 to a conveyor which carries the wet cake articles to a drying oven.

and FIG. 11 is an elevational view, taken generally along the line 11—11 of FIG. 10, further illustrating the construction of the radial arm machine.

The present invention relates to a molding system and apparatus which is advantageously used to form refractory panels for lining hot tops. The molding system includes a shredder assembly which is operated to shred asbestos which is then pneumatically conducted to a mixing tank where the asbestos and other materials are mixed with water to form a slurry. To promote the formation of the slurry and to minimize handling difficulties, the shredded asbestos and other materials are pneumatically introduced directly into the water in the mixing tank.

Once the refractory slurry has been formed in the mixing tank, its is pneumatically conducted to holding tanks from which it is selectively fed to vacuum box molding assemblies. Each of the vacuum box molding assemblies has a universal contour plate assembly which cooperates with a vacuum box to form a mold cavity. The mold cavity is flooded with the slurry which is then de-watered by the application of vacuum or suction to the mold cavity to thereby form a wet cake refractory panel.

A lift head on a radial arm machine is then operated to pneumatically engage the wet cake panel by applying vacuum or suction to an upper surface of the panel. Once the wet cake panel has been pneumatically engaged, the lift head is moved over a conveyor and the application of vacuum or suction to the wet cake panel is interrupted to effect a depositing of the wet cake panel on the conveyor. The conveyor transports the wet cake panel to a drying oven where it is dried or cured to form a refractory panel suitable for lining a hot top.

Figure 1:
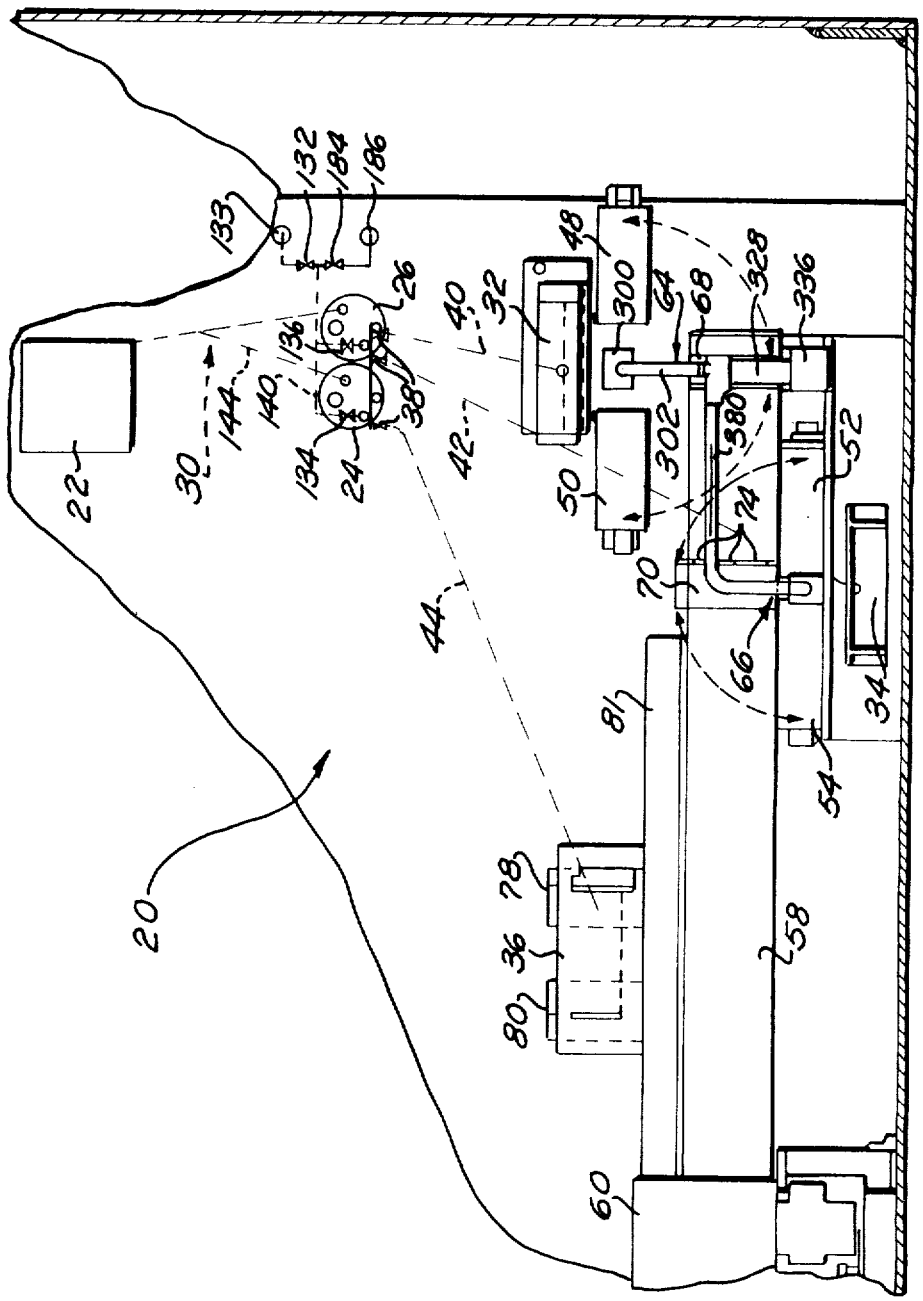

A floor plane illustrating the general layout of a plant having a molding system 20 constructed in accordance with the present invention is illustrated in FIG. 1. Although this molding system 20 is advantageously used in the formation of refractory panels for lining hot tops, it is contemplated that the molding system and apparatus constructed in accordance with the present invention could be adapted to form many different types of articles. It is also contemplated that the specific apparatus utilized in the molding system 20 could be used in association with other molding systems.

Hot top insert panels or boards, similar to those shown in U.S. Pat. No. 3,478,999 to Charman, Jr. et al. are formed by mixing a refractory slurry and then de-watering the refractory slurry to mold a wet cake panel having the desired configuration. This wet cake panel is then dried or cured in an oven to form a refractory panel suitable for lining a hot top. In accordance with the present invention, a shredder assembly 22 is utilized to shred bulk asbestos used to form the refractory slurry. A predetermined weight of shredded asbestos is mixed with a predetermined amount of silica flour to form a charge of bulk material which is mixed with a predetermined amount of water in a selected one of a plurality of mix tanks 24 and 26. Depending upon the desired characteristics of the hot top panel, predetermined amounts of sand and organic binder are included in the charge with the asbestos and silica flour. This charge is conducted to a selected one of the mix tanks 24 or 26 by a pneumatic conveyor 30.

After the charge of bulk material has been thoroughly mixed with water in a selected one of the tanks 24 or 26 to form a refractory slurry, the slurry is pneumatically conducted to a selected one of a plurality of overhead holding tanks 32, 34 or 36 by operating suitable valves 38 to direct a flow of the slurry through one of a plurality of conduits or pipes 40, 42 or 44 to the selected holding tank. The holding tanks 32, 34 and 36 have rotors which constantly agitate the refractory slurry in the holding tanks to prevent the refractor materials from settling out of the slurry.

Vacuum box molding assemblies or machines 48, 50, 52 and 54 are associated with the holding tanks 32 and 34. The vacuum box molding assemblies 48 through 54 define mold cavities which are flooded with slurry from an associated one of the holding tanks 32 through 34. Vacuum is then applied to these mold cavities to de-water the slurry and form a wet cake panel having a configuration corresponding to the configuration of the mold cavity.

These wet cake panels have a relatively low structural strength and must be gently transferred to an infeed conveyor 58 which transports the panels to an oven 60 where they are dried or cured to increase their structural strength. The wet cake panels are transferred from the vacuum box molding assemblies 48 through 54 by radial arm machines 64 and 66 having lift heads 68 and 70 which pneumatically engage the wet cake panels at an associated one of the vacuum box molding assemblies to lift the wet cake panel from the associated vacuum box molding assembly without damaging the panel. Thus, assuming a wet cake panel is to be transferred from the vacuum box molding assembly 48 to the infeed conveyor 58 by operation of the radial arm machine 64, the lift head 68 is swung in a counterclockwise direction, as seen in FIG. 1, to a position overlying the wet cake panel in the vacuum box molding assembly 48. The lift head 68 then applies vacuum or suction to the upper surface of the wet cake panel to pneumatically engage the wet cake panel. The lift head 68 is then swung in a clockwise direction (as viewed in FIG. 1) to a receiving station overlying the infeed conveyor 58. The application of suction or vacuum to the wet cake panel by the lift head 68 is then interrupted so that the wet cake panel is released and deposited on the infeed conveyor 58. The infeed conveyor 58 then transports the wet cake panel to the oven 60 where it is dried or cured. Of course, the radial arm machine 64 cooperates with the vacuum box molding assembly 50 in much the same manner as previously explained in connection with the vacuum box molding assembly 48.

The radial arm machine 66 is disposed adjacent to the infeed conveyor 58 at a location downstream from the radial arm machine 64. The radial arm machine 66 is operable to transfer wet cake panels from the vacuum box molding assemblies 52 and 54 to the infeed conveyor 58 in the same manner as in which wet cake panels are transferred from the vacuum box molding assemblies 48 and 50 to the infeed conveyor by operation of the radial arm machine 64. However, since the radial arm machine 66 is downstream from the radial arm machine 64, when a wet cake panel is to be deposited from the lift head 70 onto the infeed conveyor 58, it is necessary to first determine that a wet cake panel deposited by the radial arm machine 64 on the infeed conveyor 58 is not located beneath the lift head 70. Accordingly, a plurality of sensor fingers 74 extend downwardly toward the infeed conveyor 58 from the lift head 70. Immediately before a wet cake panel and is beneath the lift head 70, the wet cake panel will actuate one of the fingers 74 to operate a limit switch. This limit switch activates suitable control circuitry to prevent the lift head 70 from releasing a pneumatically engaged wet cake panel while the preceding wet cake panel is being moved beneath the lift head 70 by the conveyor 58.

Hot top assemblies frequently use bottom rings as well as insert panels. Accordingly, a pair of ring machines 78 and 80 are associated with the overhead holding tank 36. The ring machines 78 and 80 define mold cavities for receiving slurry from the overhead tank 36. This slurry is de-watered by the application of vacuum to the mold cavity to thereby form a wet cake hot top bottom ring having a configuration conforming to the mold cavity. These hot top rings are transferred from the ring machines 78 and 80 to a second conveyor 81. The manner of operation of the ring machines 78 and 80 is fully described in U.S. application Ser. No. 875,276 filed Nov. 10, 1969 by Walter M. Charman, Jr.; Robert R. Hayes; George J. Middaugh, Jr.; and John M. Wetzig III and entitled Method and Apparatus For Forming A Member From a Slurry of Material. In order to avoid unnecessary prolixity of description, the subject matter of that application should be considered as being incorporated herein by this reference thereto and the operation of the ring machines 78 and 80 will not be further described.

The shredder 22 is operable to shred bulk asbestos conducted from a receiving bin 84 (see FIG. 2) to the shredder 22 by a conveyor 86. The conveyor 86 is of the belt type and has an upper run or length 88 which carries the bulk asbestos into the shredder 22. Upon entering the shredder 22, the bulk asbestos is dumped onto a shredder belt 90. The shredder belt 90 extends around a drive roller or drum 94 and an idler roller drum 96 and has a lower run or stretch 98 which is spaced by a relatively small distance from a fixed shredder surface 100 which extends parallel to the lower run 98 of the shredder belt 90.

Upon operation of a motor 104, the drive pulley 94 rotates the shredder belt 90 (in the direction of arrows in FIG. 2) to pull or draw the bulk asbestos into a funnel-like entry area 108 which tapers toward the space between the lower run 98 of the shredder belt 90 and the fixed shredder surface 100. As the asbestos enters the tapering entry section 108, it is engaged by the belt 90 and pulled into the restricted space between the lower run 98 and fixed shredder surface 100. The asbestos is then shredded by being drawn through this restricted space and dumped into a weighing bin 114. When the weight of asbestos in the bin 114 is sufficient to form a charge in one of the mix tanks 24 or 26, the operation of the shredder 22 is interrupted. A predetermined volume of silica flour and organic binder are then manually dumped into the weighing bin 114 to complete the charge. It should be understood that different known materials could be added to the asbestos in the weighing bin 114 to provide a charge of the desired composition. While a charge is being accumulated in the weighing bin 114, one of the mix tanks 24 or 26 is filled with water to a predetermined level, indicated schematically at 120 in FIG. 3 for the mix tank 24.

In accordance with a feature of the present invention, the charge of bulk material is introduced into the mix tank 24 by the pneumatic conveyor 30 at a level which is below the upper surface of the water. By introducing the charge in this manner, a mixing of the asbestos and other material in the charge with the water is promoted. In addition, the introduction of the charge into the mix tank 24 in this manner by a pneumatic conveyor 30 tends to minimize the generation of objectionable dust from the shredded asbestos and other materials making up the charge. Accordingly, a conveyor tube or conduit 124 of the pneumatic conveyor 30 has an open end 128 which is located in a lower portion of the mix tank 24 at a level below the upper surface of the water. The conduit or pipe 124 is connected in fluid communication with the weighing bin 114.

A charge of material is drawn through the pneumatic conveyor 30 and out of the open end 128 of the tube or conduit 124 by providing a pressure differential between the interior of the mix tank 24 and the weighing bin 114. Accordingly, a control valve 132 (FIG. 1) is operated to an open condition to connect the mix tank 24 with a pump or source of a vacuum 133. It should be noted that the word vacuum is used herein to refer to a pressure which is substantially below atmospheric or ambient pressure. The source vacuum or suction 133 is connected with the mix tank 24 by opening a valve 134 (FIG. 1). A control valve 136 is maintained in a closed condition to prevent the vacuum from being conducted to the mix tank 26. The pump 133 is connected in fluid communication with an upper portion of the mix tank 24 by a conduit or pipe 140.

Upon application of vacuum or suction to the upper portion of the mix tank 24 through the conduit 140, a pressure differential is generated between the upper portion of the mix tank 24 and the weighing bin 114. This results in the charge of material being pneumatically conveyed from the weighing bin through a tube or conduit arrangement 144 to the discharge tube 124 which extends into the water in the mix tank 24. The bulk material is drawn pneumatically through the open end portion 128 of the discharge tube 124 at a level below the surface of the water to promote a mixing of the bulk material with the water.

A deflector plate 148 is mounted adjacent to the open end 128 of the discharge tube 124 and extends downwardly and sidewardly at an acute angle to deflect the flow of bulk material as it exits from the open end 128 of the discharge tube 124. By experimentation it has been determined that the discharge plate 148 substantially decreases the amount of splashing in the mix tank 24 by the discharge of the bulk material into the water. However, some splashing does occur. Therefore, a baffle arrangement 154 (FIG. 4) is provided in the upper portion of the mixed tank 24 adjacent to the entrance of the pipe or conduit 140 through which vacuum or suction is applied to the mix tank 24. The baffle arrangement 154 prevents any water and other material which may be splashed upwardly in the mixed tank 24 as the bulk material is drawn into the mixed tank from being sucked into the conduit 140.

After the charge of bulk material has been conducted to the mix tank 24, the control valves 132 and 134 are operated to a closed position to interrupt the application of vacuum or suction to the mix tank 24. Impellers 160 and 162 mounted on a drive shaft 164 in the mixed tank 24 are then rotated by operation of a motor 166. Rotation of the impellers 160 and 162 agitates the water to provide a mixing of the charge of bulk material and water to form a refractory slurry.

The refractory slurry is held in the mix tank 24 until it is required in one of the overhead holding tanks 32, 34 or 36. At that time a suitable valve is opened and the slurry is pneumatically conducted from the mixed tank to the holding tank. Assuming that the slurry is to be conducted from the mixed tank 24 to the holding tank 32, the valve 38 in the pipe line 40 is opened. The upper portion of the mix tank 24 is then pressurized by air conducted through a conduit 170 to the mix tank. The pressure differential between the upper portion of the mix tank 24 and the holding tank 32, which is exposed to atmospheric or ambient pressure, results in the slurry being forced through an open end 174 of a slurry discharge tube 176 which is connected in fluid communication with the conduit 40. The pressure differential between the upper portion of the mix tank 24 and the holding tank 32 is sufficient to force the slurry through the conduit 40 into the holding tank in a known manner. When the mix tank 24 is substantially emptied, a known probe 180 detects the relatively low level of slurry in the mix tank 24. The probe 180 effects operation of known control circuitry to close the valve 38 and operate control valves so that the mix tank 24 is no longer connected in fluid communication with the holding tank 32 and is exhausted to the atmosphere. If desired, a portion of the slurry in the mixed tank 24 can be conducted to a selected one of the two holding tanks 34 or 36 by operating suitable control valves while maintaining the air pressure in the upper portion of the mix tank 24.

Once a batch of slurry has been emptied from the mix tank 24, the mix tank is re-used to form a next succeeding batch of slurry. Before the bulk material is conducted from the weighing bin 114 to the mix tank 24 for this batch of slurry, the mix tank must be filled with water to a predetermined level. This is accomplished by operating a control valve 184 (FIG. 1) to connect the conduit 140 in communication with a source 186 of water. The valve 134 is then opened, while the valves 132 and 136 remain closed, to direct the flow of water through the conduit 140 into the mix tank 24. It should be noted that this flow of water will wash down the baffle arrangement 154. When the mix tank 24 has been filled to the desired level with water, a probe 190 is activated to effect operation of the valve 184 to a closed position. The valve 132 can then be opened to connect the upper portion of the mix tank 24 with a source of vacuum or suction through the conduit 140 which had previously conducted the water to the mixed tank 24. As was previously explained, connecting the upper portion of the mixed tank 24 with the source of vacuum or suction results in the bulk material being pneumatically conducted from the weighing bin 114 to the mix tank 24.

The mix tank 26 is of the same construction as the mix tank 24 and is connected in fluid communication with the shredder assembly 22 by the pneumatic conveyor 30. The mix tank 26 can also be connected in fluid communication with the pump 133 and source of water 186 by suitable operation of the valves 132 and 184 and the valve 136. Therefore, it is believed that it will be apparent that the operation of the mix tank 26 is substantially the same as previously described for the mix tank 24. Therefore, in order to avoid unnecessary prolixity of description, the operation of the mix tank 26 will not be further described.

The molding machines 48 through 54 are operable to the de-water slurry conducted from the overhead holding tanks 32 and 34 to the associated vacuum box molding assemblies to thereby mold a wet cake panel having a desired configuration. Thus, when a universal contour plate assembly 200 of the vacuum box molding assembly 50 is moved downwardly from the raised or inactive position shown in solid lines in FIG. 5 to the lowered or molding position shown in dash lines in FIG. 5 by an operator assembly 204, the universal contour plate 200 cooperates with a screen or grid 206 of a vacuum box 208 to define a mold cavity which opens upwardly and is indicated schematically at 212 in dashed lines in FIG. 5. The mold cavity 212 is flooded with slurry from the overhead molding tank 32. This slurry is then de-watered, in a known manner, by application of vacuum or suction to the mold cavity 212. As the water is drawn out of the slurry in the mold cavity 212, a wet cake of refractory material forms in the mold cavity. This wet cake of refractory material has a configuration corresponding to the configuration of the mold cavity and the desired shape for a hot top panel.

The wet cake panel of refractory material is transferred from the vacuum box molding assembly 50 to the infeed conveyor 58 by operation of the radial arm molding machine 64 (FIG. 10). To enable the wet cake panel to be pneumatically engaged by the lift head 68 of the radial arm machine 64, the operator assembly 204 (FIGS. 5 and 6) is activated to pivot the universal contour plate assembly 200 from the molding or operating position shown in dash lines in FIG. 5 to the raised position shown in solid lines in FIG. 5. The wet cake panel is then exposed on the grid 206 so that it can be readily engaged by the lift head 68.

The operator assembly 204 for pivoting the universal contour plate assembly 200 between the raised and lowered positions includes a piston and cylinder assembly 220 (FIG. 6) having a piston rod 222 which is pivotally connected at its upper end to a support or actuator section 226 which is in turn pivotally mounted on a support shaft 228. The support shaft 228 is rotatably mounted on a frame assembly 230. Upon operation of suitable control valves 234 and 236 hydraulic fluid is conducted through conduits 238 and 240 to either extend or retract the piston and cylinder assembly 220. When the piston and cylinder assembly 220 is extended from the retracted condition shown in FIG. 6, the support section 226 is pivoted in a clockwise direction (as viewed in FIG. 6) about the longitudinal axis of the support shaft 228 to move the universal contour plate assembly 200 from the raised or inactive position as shown in FIG. 6 to the molding position shown in dash lines in FIG. 5. In the lowered position, the universal contour plate assembly 200 rests on the grid 206 of the vacuum box 208 to define the mold cavity 212 which is flooded with slurry from the holding tank 32.

Figure 7:
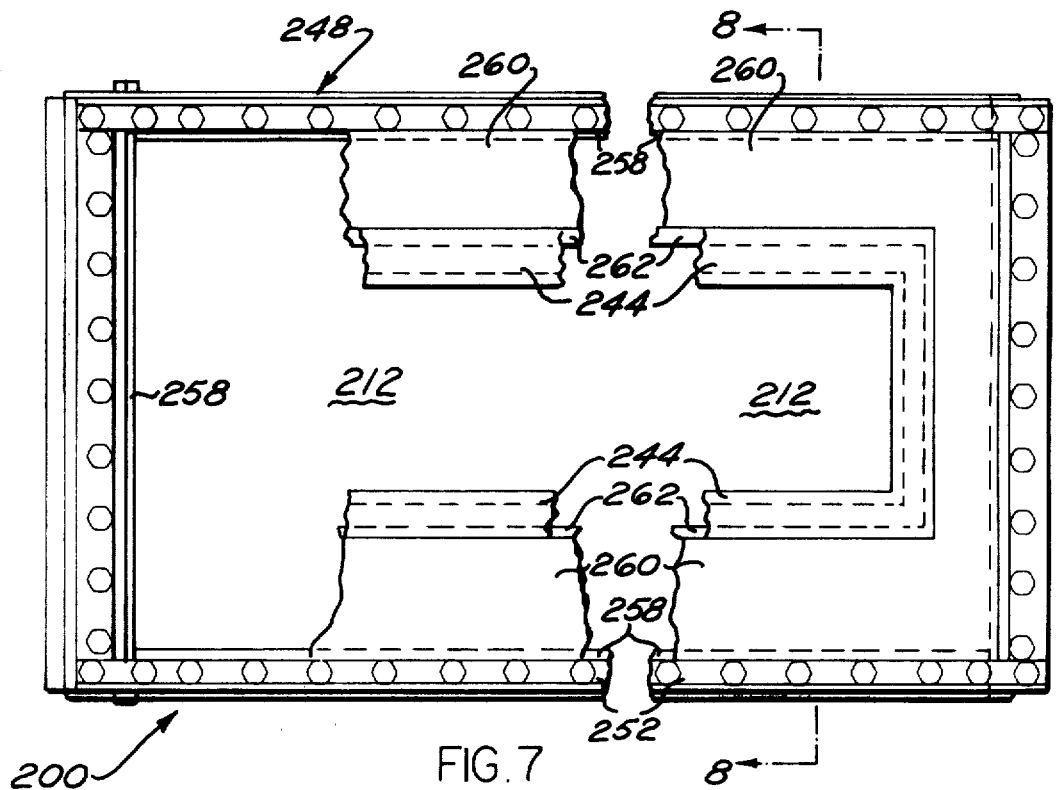
FIG. 7 is a fragmentary plan view illustrating the construction of a universal contour plate assembly of FIGS. 5 and 6.
Figure 8:
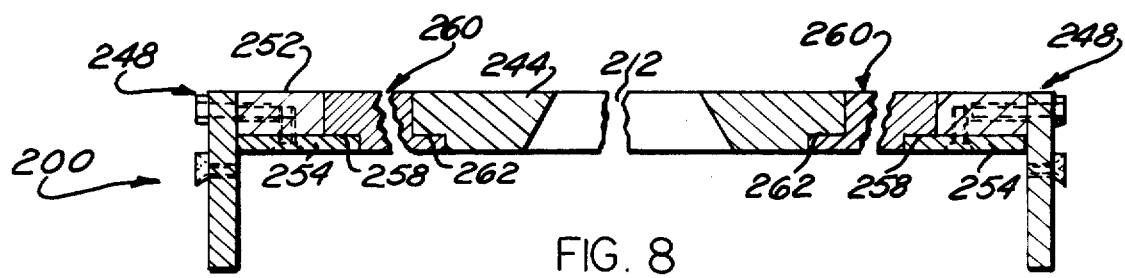
FIG. 8 is a fragmentary sectional view schematically illustrating the relationship between the universal contour plate assembly and a vacuum box.

It is contemplated that the universal contour plate assembly 200 (see FIGS. 7 and 8) will be used with contour plates 244 of different sizes to define mold cavities to make refractory panels of different dimensions. The exterior dimensions of the contour plates 244 vary with variations in the size of the mold cavity 212. When changing from a mold cavity contour plate of one size to a mold cavity and contour plate of another size, it has been the practice to change the entire contour plate assembly. In accordance with the present invention, the universal contour plate assembly 200 has a frame 248 for holding contour plates of different sizes. The frame 248 includes a rectangular main or upper section 252 to which a rectangular support plate 254 is fixedly connected in the manner illustrated in FIG. 8. The support section 254 cooperates with the main section 252 to define an inwardly projecting lip 258 which extends completely around the rectangular interior opening in the main support section 252 to form a rectangular support shelf. The lip 258 can be engaged by a recess formed in the periphery of a large contour plate 244 for defining a relatively large mold cavity 212. However, when a relatively small mold cavity 212 is to be defined by a relatively small contour 244, a rectangular filler plate 260 is mounted in the opening defined by the frame 248. As is perhaps best seen in FIG. 7, the filler plate 260 has a generally rectangular configuration and has an inwardly projecting lip 262 which defines a rectangular opening for receiving the relatively small contour plate 244. It should be noted that the rectangular lip 262 is disposed at the same level as is the support section 254 (see FIG. 8) so that the contour plate 244 supported by the frame 248 in the same position relative to the vacuum box 208 as if the contour plate 244 was mounted directly on the support frame 248. Of course, the filler plate 260 associated with a particular contour plate 244 defines a rectangular central opening corresponding to the external dimensions of the associated contour plate.

When the universal contour plate assembly 200 is in a molding position, the support plate 254 engages side walls of the vacuum box 208 to seal the vacuum box. The contour plate 244 rests directly on the grid 206 and side walls so that the grid and contour plate cooperate to define the mold cavity 212. The grid 206 is of a relatively fine mesh which is capable of supporting the refractory particles in the slurry while the water is being drawn out of the slurry to form a wet cake panel having a configuration corresponding to the mold cavity 212.

If the support plate 254 is raised slightly off the walls of the vacuum box 208 when the vacuum is applied to the mold cavity 212 through the grid 206, air will leak into the vacuum box and impair the efficiency of operation of the vacuum box molding assembly 50. The support shaft 228 for the universal contour plate assembly 200 is movable vertically relative to the frame 230 (see FIG. 6). This vertical movement of the support shaft 228 enables the inner end portion of the universal contour plate assembly 200 to float or move freely in a vertical direction so that the support plate 254 of the frame assembly 248 sealingly engages the walls of the vacuum box 208 throughout the circumference of the vacuum box.

Figure 9:
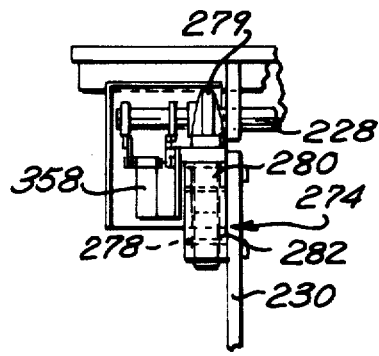
FIG. 9 is a fragmentary elevational view, taken generally along the line 9—9 of FIG. 6, illustrating a mounting arrangement for the universal contour plate assembly.

The support shaft 228 is mounted for vertical movement by a pair of mounting assemblies 274 (only one of which is shown in FIGS. 6 and 9). The mounting assemblies 274 are identical in construction and include a downwardly projecting pin 278 which is fixedly connected to a journal block 279. The journal block 279 supports the shaft 228 for rotational movement about its longitudinal axis. The pin 278 is slidably received in a pair of bearing assemblies 280 and 282 mounted on the support frame 230. The bearing assemblies 280 and 282 (FIG. 9) enable the pin 278 to move vertically to adjust the height of the support shaft 228 so that the universal contour plate assembly 200 rests on the walls 270 of the vacuum box 208 when the universal contour plate assembly 200 is in the lowered or molding position.

The vacuum box molding assemblies 48, 52 and 54 are of the same construction as previously described for the vacuum box molding assembly 50. However, it should be understood that the orientation of the vacuum box molding assemblies 48 and 52 is reversed from that of the vacuum box molding assembly 50 so that the operator assemblies, similar to the operator assembly 204 for the vacuum molding box assembly 50, is operable to pivot the associated universal contour plate assemblies upwardly and away from the radial arm machines 54 and 66. By pivoting the universal contour plate assemblies upwardly and away from the radial arm machines 64 and 66, the lift heads 68 and 70 of the radial arm machines can be moved into a position directly overlying a molded, wet cake panel laying on the grid or screen, corresponding to the grid or screen 206 of the vacuum box molding assembly 50, when the universal contour plate assemblies are in the inactive or raised The radial arm machine 64 is operable to move the lift head 68 to pneumatically engage a wet cake panel formed by the vacuum box molding assembly 48 or the vacuum box molding assembly 50 and transfer the engaged wet cake panel to the infeed conveyor 58. The radial arm machine 68 includes a base 300 to which a main support arm 302 is pivotally connected at an inner end 304. The lift head 68 is movably mounted on an outer end portion of the arm 302. The arm 302 is pivotal in either a clockwise or a counterclockwise direction (as viewed in FIG. 1) to move the lift head 68 to a position overlying either the vacuum box molding assembly 48 or the vacuum box molding assembly 50. Assuming that the arm 302 is moved in a counterclockwise direction (as viewed in FIG. 1) so that the lift head 68 overlies the vacuum box molding assembly 48, the lift head 68 is then lowered by operating a piston and cylinder assembly 310 to the extended position shown in FIG. 10. Extending the piston and cylinder assembly 310 moves an actuator lever 314 from the position shown in dash lines in FIG. 10 to the position shown in solid lines to operate a parallel arm linkage arrangement 316 to lower the lift head 68 relative to the arm 302.

When the lift head 68 is lowered, a rectangular grid 320 forming a lower surface of the lift head 68 rests on the wet cake panel in the vacuum box molding assembly 48. The grid 320 has a generally rectangular configuration and is slightly larger than the grid or screen 206 of the vacuum box molding assembly. A counter-balancing spring assembly 321 applies the counter-balancing force to the linkage arrangement 316 by means of a lever 322 to offset the weight of the lift head 68 so that the relatively delicate wet cake panel is not damaged by the lift head 68.

Once the grid 320 of the lift head 68 has been brought into engagement with the wet cake panel, suction or vacuum is applied to the lift head 68 through a conduit assembly 328. The conduit assembly 328 includes a portion 329 which is mounted on the arm 302 by a support assembly 330. A swivel joint assembly 331 rotatably connects the portion 329 of the conduit assembly 328 mounted on the arm 302 with a fixed section 332 of conduit (see FIGS. 10 and 11). An end section 333 (FIG. 10) of the conduit assembly 328 is connected in fluid communication with the grid 320 on the lift head 68. A flexible section 334 of conduit connects the outer section 333 of conduit with an inner section 335 of conduit. The flexible section 334 of conduit enables the outer section 333 of conduit to move with the lift head 68 upon operation of the piston and cylinder assembly 310. The fixed section 332 of conduit is connected in fluid communication with a source of low pressure suction or vacuum, such as a blower 336 (FIG. 1).

Once a wet cake panel has been drawn or sucked tightly against the grid 320 by low pressure suction, the piston and cylinder assembly 310 is retracted to operate the linkage 316 and raise the lift head 68. The arm 302 is then moved in a clockwise direction (as viewed in FIG. 1) to move the lift head 68 to a position overlying the infeed conveyor 58. By operation of the motor assembly 337. A valve 338 in the vacuum conduit 335 is operated from the open position illustrated in dashed lines in FIG. 10 to the closed condition by a hydraulic piston cylinder assembly 339 to interrupt the application of vacuum or suction to the lift head 68. This results in the wet cake panel being deposited on the infeed conveyor 58.

A brake assembly 340 is associated with the arm 302 to hold the arm in a pickup position over a selected one of the vacuum box molding assemblies 48 or 50 and to hold the arm in release position over the infeed conveyor 58. The brake assembly 340 includes a pair of brake shoes 342 and 344 which are fixedly connected to the arm 302. A brake disc 348 extends between the brake shoes 342 and 344 and is fixedly connected to the base 300. When the arm 302 is moved to a selected operating position, the brake shoes 342 and 344 are operated to a closed condition to grip the brake disc 348 and hold the arm 302 against movement.

A cam disc 352 is fixedly connected with a support shaft 353 at the inner end of the arm 302 and rotates with the arm. A plurality of actuators 355 (only one of which is shown) are mounted on the cam disc 352 for operating associated limit switches when the arm 302 has been moved to a selected operating position to thereby interrupt operation of the drive assembly 337. The drive assemblies 337 includes a reversible electric motor 354 which drives a sprocket 356 through a speed reduced assembly 358. Rotation of the sprocket 356 moves a chain 360 to rotate a sprocket 362 which is fixedly connected with the support shaft 353 for the arm 302. Therefore, operation of the motor 358 drives the sprocket 362 through the chain 360 to effect rotation of the arm 302 relative to the base 300.

After a wet cake panel has been formed by operation of the vacuum box molding assembly 50 (see FIG. 5), the universal contour plate assembly 200 is pivoted to the raised position and a limit switch 368 (FIG. 6) is operated by an actuator 372 which rotates with the support shaft 228. Upon actuation of the limit switch 368, a circuit is completed to render the radial arm machine 64 responsive to actuation of a start switch by an operator. Actuating the start switch results in the brake assembly 340 (FIG. 10) being operated to the release condition. Contemporaneously therewith, the motor 354 is energized to effect pivotal movement of the arm 302 in a clockwise direction (as viewed in FIG. 1) toward the vacuum box molding assembly 50. When the lift head 68 overlies the vacuum box molding assembly 50, an actuator member or cam on the disc 352 operates a limit switch to interrupt operation of the motor 358. The piston and cylinder assembly 310 is then extended to lower the lift head 68. When the lift head 68 reaches a lowered position, the grid 320 is disposed in engagement with and extends outwardly of the molded wet cake panel on the grid 206 of the vacuum box molding assembly 50. A limit switch is then actuated by the linkage assembly 316 to complete a circuit for effecting operation of the piston and cylinder assembly 339 to open the valve 338 in the duct assembly 328 so that the vacuum is applied to the lift head 68. This vacuum or suction draws a stream of air through the grid 320 and around the wet cake panel to urge the wet cake panel upwardly against the grid. In this manner, the lift head 68 pneumatically engages a wet cake panel resting on the grid 206 of the vacuum box molding assembly 50.

After a predetermined time interval, the piston and cylinder assembly 310 is retracted to operate the linkage arrangement 316 and raise the lift head 68 upwardly. This upward movement of the lift head 68 lifts the wet cake panel off the grid 206 of the molding machine 50 (see FIG. 5). When the lift head reaches the raised position, a limit switch is actuated by the linkage arrangement 316 to complete a circuit which effects operation of the brake assembly 340 to the release condition and initiates operation of the motor 354 to swing the arm 302 away from the vacuum box molding assembly 50 toward the infeed conveyor 58. During this movement of the lift head 68, the blower 336 continues to draw air through the grid 320 to maintain the lift head 68 in secure pneumatic engagement with the wet cake panel being transported by the lift head. When the arm 302 reaches the position shown in FIG. 1 in which the lift head 68 is directly over the infeed conveyor 58, an actuator on the cam disc 352 operates a limit switch to effect the de-energization of the motor 354 and to simultaneously therewith effect operation of the brake assembly 340 to the engaged condition. The piston and cylinder assembly 336 is then retracted to close the valve 338 in the duct assembly 328. This interrupts the application of vacuum or suction to the lift head 68 and wet cake panel is dropped onto the infeed conveyor 58. The infeed conveyor 58 carries the wet cake panel to the drying oven 60. The radial arm machine 64 is operable to remove a wet cake panel from either the vacuum box mold assembly 48 or from the vacuum box mold assembly 50. Similarly, the radial arm machine 66 is operable to remove a wet cake panel from either the vacuum box assembly 52 or the vacuum box assembly 64. The lift head 70 of the radial arm machine 66 is connected with the vacuum or suction blower 336 through a duct 380. Since the radial arm machine 66 is constructed and operates in the same manner as the radial arm machine 64, further description of the operation of the radial arm machine 66 is not necessary at this time.

What is claimed is:

1. Apparatus for moving a wet cake article from a mold assembly located at a pickup station to a receiving station, said apparatus comprising a lift head, drive means for moving said lift head between the pickup and receiving stations, pneumatic means connected in fluid communication with said lift head for applying suction to a surface of a wet cake article when said lift head is at the pickup station to thereby effect pneumatic engagement of the wet cake article by said lift head and for maintaining the application of suction to the wet cake article during movement of said lift head from the pickup station to the receiving station to thereby provide for movement of the wet cake article to the receiving station by said lift head, and means for effecting a depositing of the wet cake article at the receiving station by interrupting the application of suction to the wet cake article by said pneumatic means upon movement of said lift head and wet cake article to the receiving station, said lift head including a grid having an area which is greater than the area of the surface of the wet cake article to which suction is applied at the pickup station, and said pneumatic means includes a source of suction and conduit means for connecting said source of suction in fluid communication with said grid and for effecting a flow of air around the wet cake article and through said grid to urge the wet cake article against said grid and thereby effect pneumatic engagement of the wet cake article by said lift head.

2. An apparatus as set forth in claim 1 wherein said means for effecting a depositing of the wet cake article at the receiving station includes valve means operable between an open condition in which said grid is in fluid communication with said source of suction and a closed condition blocking fluid flow from said grid to said source of suction.

3. An apparatus as set forth in claim 1 further including actuator means for lowering said lift head into engagement with the wet cake article when said lift head is at the pickup station and for moving the lift head and wet cake article upwardly relative to the mold assembly after the wet cake article has been pneumatically engaged by said lift head.

* * * * *